US 9,326,177 B2

(12) United States Patent
Liu et al.

(10) Patent No.: US 9,326,177 B2
(45) Date of Patent: Apr. 26, 2016

(54) SYSTEMS AND METHODS FOR ADAPTATION AND RECONFIGURATION IN A WIRELESS NETWORK

(71) Applicant: FutureWei Technologies, Inc., Plano, TX (US)

(72) Inventors: Jialing Liu, Palatine, IL (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 65 days.

(21) Appl. No.: 14/080,061

(22) Filed: Nov. 14, 2013

(65) Prior Publication Data

US 2014/0133333 A1    May 15, 2014

Related U.S. Application Data

(60) Provisional application No. 61/726,426, filed on Nov. 14, 2012.

(51) Int. Cl.
*H04L 12/26* (2006.01)
*H04W 24/10* (2009.01)
*H04W 84/04* (2009.01)

(52) U.S. Cl.
CPC ............ *H04W 24/10* (2013.01); *H04W 84/045* (2013.01); *Y02B 60/50* (2013.01)

(58) Field of Classification Search
None
See application file for complete search history.

(56) References Cited

U.S. PATENT DOCUMENTS

| 8,305,987 | B2 | 11/2012 | Fong et al. |
| 2011/0199986 | A1 | 8/2011 | Fong et al. |
| 2012/0176924 | A1 | 7/2012 | Wu et al. |
| 2012/0201163 | A1 | 8/2012 | Jongren et al. |
| 2012/0213261 | A1 | 8/2012 | Sayana et al. |
| 2012/0250551 | A1 | 10/2012 | Sartori et al. |

FOREIGN PATENT DOCUMENTS

| WO | 2011038243 A2 | 3/2011 |
| WO | 2011142715 A1 | 11/2011 |
| WO | 2012047144 A1 | 4/2012 |
| WO | 2012148443 A1 | 11/2012 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC): Protocol Specification (Release 11)," 3GPP TS 36.331 V11.1.0, Sep. 2012 Technical Specification, 325 pages.

(Continued)

*Primary Examiner* — Feben M Haile
(74) *Attorney, Agent, or Firm* — Slater Matsil, LLP

(57) ABSTRACT

An embodiment method for adaptation and reconfiguration in a wireless network includes base stations coordinating and setting aside a set of time-frequency resources for probing purposes, the base stations coordinating a set of probing transmissions and timings to be used to synchronize base stations/UEs actions, the base stations signaling the resources and timings to UEs, the base stations performing coordinated operations on the resources according to the timings, the base stations receiving feedback reports from UEs based on UE measurements on the signaled resources according to the signaled timings, and the base stations further coordinating the operations for further probing or to apply probing transmissions on broader time-frequency resources.

32 Claims, 9 Drawing Sheets

(56) References Cited

OTHER PUBLICATIONS

"Notification of Transmittal of the International Search Report and the Written Opinion of the International Searching Authority, or the Declaration," International Application No. PCT/US2013/070126, Applicant: Huawei Technologies Co., Ltd., mailing date: Feb. 7, 2014, 10 pages.

Extended European Search Report received in Application No. 13855411.8-1854 mailed Oct. 16, 2015, 10 pages.

Nokia Siemens Networks, "Measurement Gap Creation," 3GPP TSG-RAN WG4 Meeting #43bis, Orlando, Florida, Jun. 25-29, 2007, 4 pages.

SYSTEMS AND METHODS FOR ADAPTATION AND RECONFIGURATION IN A WIRELESS NETWORK

This application claims the benefit of U.S. Provisional Application Ser. No. 61/726,426, filed on Nov. 14, 2012, and entitled "Systems and Methods for Adaptation and Reconfiguration in a Wireless Network," which application is hereby incorporated herein by reference.

TECHNICAL FIELD

The present invention relates to systems and methods for wireless communications, and, in particular embodiments, to systems and methods for adaptation and reconfiguration in a wireless network.

BACKGROUND

Wireless communication systems include long term evolution (LTE), LTE-A, and LTE-A-beyond systems. Typically, in a modern wireless communications system, there is a plurality of NodeBs (NBs) (also commonly referred to as base stations, communications controllers, or eNBs (enhanced NBs), and so on, and may even include network points using different radio access technologies (RATs) such as high speed packet access (HSPA) NBs and WiFi access points). A NodeB may be associated with a point or multiple points, and a cell may include a point or multiple points, with each point having a single or multiple antennas. A point may also correspond to multiple cells operating in multiple component carriers. The eNBs are interconnected with each other by means of an X2 interface. The eNBs are also connected by means of an S1 interface to a Mobility Management Entity (MME) and to a Serving Gateway (S-GW). Additionally, a cell or NB may be serving a number of users (also commonly referred to as User Equipment (UE), mobile stations, terminals, devices, and so forth) over a period of time.

Generally speaking, in orthogonal frequency division multiplexing (OFDM) systems, the frequency bandwidth of the system is divided into multiple subcarriers in the frequency domain. In the time domain, one subframe is divided into multiple OFDM symbols. The OFDM symbol may have a cyclic prefix to avoid the inter-symbol interference caused by multi-path delays. One resource element (RE) is defined by the time-frequency resource within one subcarrier and one OFDM symbol. In a downlink transmission, reference signals (RSs) and other signals such as a data channel (physical downlink shared channel (PDSCH)), a control channel (physical downlink control channel (PDCCH)), and an enhanced PDCCH (EPDCCH) are orthogonal and multiplexed in different resource elements in the time-frequency domain. In an uplink transmission, physical uplink shared channel (PUSCH) and physical uplink control channel (PUCCH) are orthogonal and multiplexed in different time-frequency resources. A set of REs are grouped together to form a resource block (RB), for example, 12 subcarriers in a slot make up a RB.

Generally, to enable any data channels in either uplink (UL) or downlink (DL) transmissions such as PDSCH or PUSCH of an LTE-A system, reference signals are transmitted. There are reference signals for a UE to perform channel/signal estimation/measurements for demodulation of PDCCH and other common channels as well as for some measurements and feedback, which is the Common/Cell-specific Reference Signal (CRS) inherited from the Rel-8/9 specification of E-UTRA. A Dedicated/De-modulation reference signal (DMRS) can be transmitted together with the PDSCH channel in Rel-10 of E-UTRA. DMRS is used for channel estimation during PDSCH demodulation. In Rel-10, the Channel State Information Reference Signal (CSI-RS) is introduced in addition to CRS and DMRS. CSI-RS is used for Rel-10 UEs to measure the channel status, especially for multiple antennas cases. PMI/CQI/RI and other feedback information may be based on the measurement of CSI-RS for Rel-10 and beyond UE. PMI is the precoding matrix indicator, CQI is the channel quantity indicator, and RI is the rank indicator of the precoding matrix. CSI-RS in Rel-10 can support up to 8 transmission antennas while CRS can only support maximal 4 transmission antennas in Rel-8/9. The number of CSI-RS antenna ports can be 1, 2, 4, and 8. In addition, to support the same number of antenna ports, CSI-RS has much lower overhead due to its low density in time and frequency.

A heterogeneous network (HetNet) comprises high power macro points and various lower power points that generally may share the same communication resources. The lower power points may include, but are not limited to, picos, micros, remote radio heads (RRHs), femtos (or home eNBs (HeNBs)), access points (APs), distributed antennas (DAS), relays, and near field communication points.

A network also may comprise several component carriers operating in different frequency bands. High frequency bands generally have a high pathloss over distance so they are more suitable to serve a relatively smaller area, such as being used for high throughput purposes for nearby UEs. Low frequency bands generally have low pathloss over distance so they are more suitable to serve a relatively large area, such as being used for providing coverage.

SUMMARY

An embodiment method for adaptation and reconfiguration in a wireless network includes eNBs coordinating and setting aside a set of time-frequency resources for probing purposes, the eNBs coordinating a set of probing transmissions and timings to be used to synchronize eNBs/UEs actions, the eNBs signaling the resources and timings to UEs, the eNBs performing coordinated operations on the resources according to the timings, the eNBs receiving feedback reports from UEs based on UE measurements on the signaled resources according to the signaled timings, and the eNBs further coordinating the operations for further probing or to apply probing transmissions on broader time-frequency resources.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are motivated by a few issues emerging from wireless networks as detailed below. A network point in a wireless network may be turned on or off based on traffic demand, energy constraints, emission constraints, QoS constraints, or interference management purposes. One solution by the inventors for handling such an event is based on UL Transition Request Signals (TRS) sent by a group of UEs so that the network can determine whether it is beneficial to turn on a turned-off network point. In an example as shown in system 100 in FIG. 1, if Pico2 102 is decided to be turned on/off, it affects UE1 104 and UE2 106 (both are in Pico2 102 coverage area) as well as UE3 108 (which is not in Pico2 102 coverage area but is not far from Pico2 102). UE1 104 and UE2 106 may be configured to measure and report Pico2's RS and may handover to Pico2 102, i.e., UE1 104 and UE2 106 may need to be reconfigured. UE3 108 may see increased physical downlink shared channel (PDSCH) interference, which may be statistically/qualitatively different from before; namely, this increased interference seen by UE3 108 is not due to the normal fluctuations of interference, rather it signifies a sudden change of UE3's interference condition which requires special handling. UE3 108 channel state information (CSI) (CQI/PMI/RI), RRM/RLM measurement processes and reports may need to change (be reconfigured). The network may need to adjust/fine tune parameters before, during, and/or after the transition. The network may need to evaluate the impact of network reconfiguration. Further, the network may need to send reconfiguration signals to user equipment (UE)/eNodeB (eNB) to facilitate UE reconfiguration. In general, when a configuration of a network point/carrier undergoes a transition, the transition may affect multiple points/carriers and multiple UEs in the sense that they may need to reconfigured. A procedure to prepare for, support, and handle the transition and reconfiguration may be needed.

Figure 2:
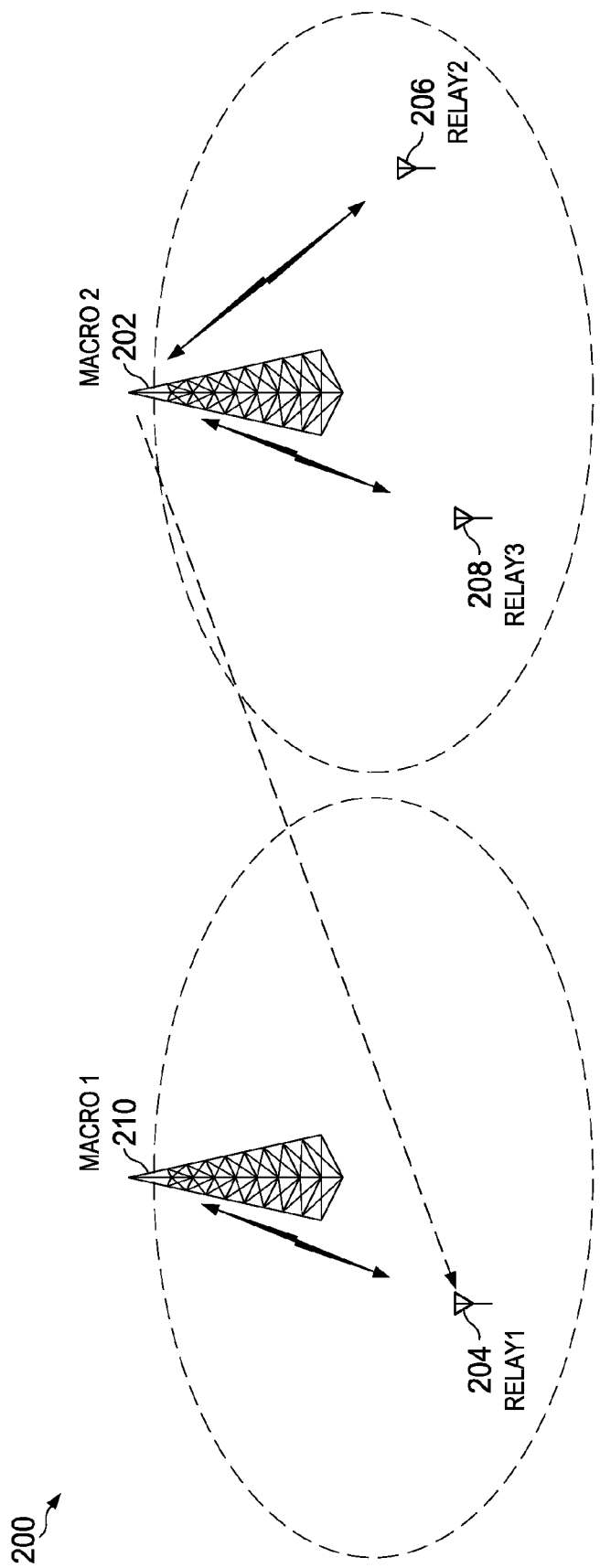
FIG. 2 illustrates interference from an eNB to a relay.

In an example as shown in system 200 in FIG. 2, Macro2 202 interference to Relay 1 204 reception may jump if Macro2 202 changes its backhaul transmission (Tx) activities, e.g., Macro2 202 precoding drifting beyond a threshold after some time, backhaul Tx on/off due to traffic pattern changes, Macro2 202 switching from Tx to Relay2 206 to Tx to Relay3 208 due to traffic pattern changes; etc. This, again, is an example of the network experiencing a transition which may lead to a chain reaction to multiple network nodes (e.g. multiple network nodes seeing sudden interference condition changes) for a period of time. As a result of, or in anticipation of the interference jump, Macro1 210 adjusts its transmission to Relay1 204. This further causes changes of interference from Macro1 210 to other Macro transmissions, for example Macro2 202 needs to further adjust (i.e., fine-tune) its transmission to Relay2 206/Relay3 208. This chain reaction of sudden interference jumps may require the network to adjust its configurations for a period of time. The effect of the adjustments may be difficult to predict unless the adjustments are actually put into test in the network, and therefore, an efficient way without significantly affecting normal data transmissions is desired to support the adjustments.

As another general example, more and more algorithms and procedures proposed for network optimization are based on iterations among multiple network nodes and sometimes multiple UEs are also involved. One case involves the joint optimization of cell attachment and and resource allocation, which is difficult to carry out in general and is usually done suboptimally in an iterative fashion. In other words, a suboptimal solution usually assumes a fixed cell attachment, and then compute optimal resource allocation for the given cell attachment. Next it assumes the given resource allocation, and further updates the cell attachment, and iterates till convergence or for some maximum number of iterations. Such iterations, however, can lead to complexity and unwanted fluctuations that are not desired for data (e.g., PDSCH) transmissions. For instance, sometimes such an iterative algorithm may not generate the desired performance/behavior in a number of iteration, and the network configuration obtained after several iterations may be eventually discarded, with the network reverts back to the original network configuration; when it occurs the normal data transmissions between multiple network nodes and multiple UEs may be significantly affected. Therefore it is desirable to separate the resources/processes for normal data transmission and the iterative probing/optimization/reconfiguration/adjustment actions. When the iteration achieves convergence on the probing resources with the desired/acceptable performance/behavior, the attained configurations are then applied to PDSCH transmissions.

The above and similar issues may be summarized as follows. A network component may often adapt its activity or go through transitions. For example, a network node/carrier/antenna set in an activity level (e.g., with reduced transmission power) or state (e.g. dormant state) may need to transition to a different activity level (e.g., with full transmission power) or state (e.g. active state) when traffic/interference/etc. conditions change. As an example, a dormant node may be turned on when UEs enter its coverage range. The reconfiguration of a first network node will affect a number of network nodes and UEs, including the first node itself, thus generating transient dynamics for a period of time. The impact of the transition/adaptation should be evaluated by multiple nodes/UEs before, during, and/or after it takes place. The procedure may need to iterate, where the network and UEs further adjust or fine-tune their configurations. When a network node experiences or foresees a transition, it may signal its UEs and other nodes regarding the transition so that the UEs and other nodes may know when to further adapt. Several aspects of the general procedure are described below.

Interference Jump and Reconfiguration Signal to UE

Figure 1:
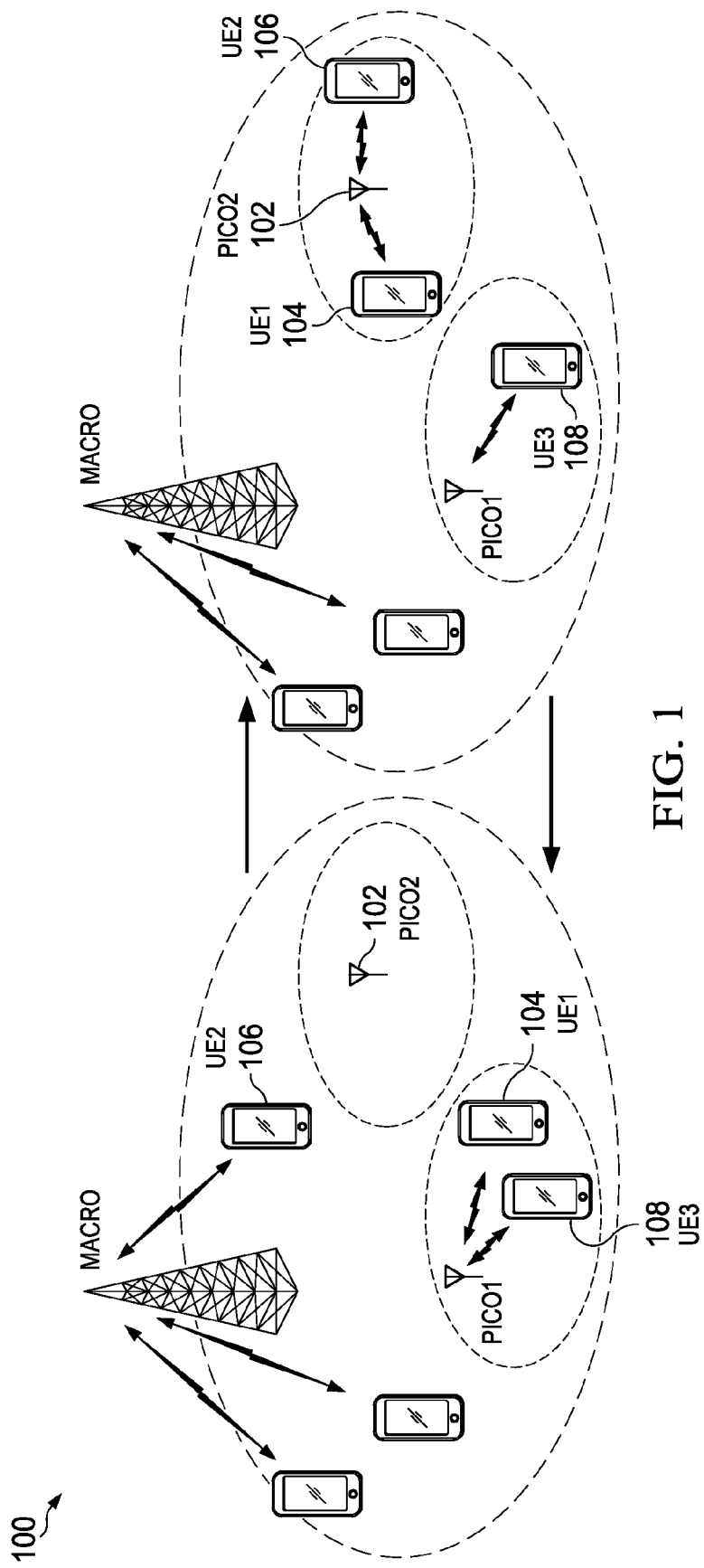
FIG. 1 illustrates the turning on/off of a network point.

In FIG. 1, when Pico2 102 starts to Tx PDSCH at time t, UE3 108 may see increased PDSCH interference statistically/qualitatively different from before. This interference condition change is different from normal interference fluctuations. Typically UE3 108 performs layer 1 filtering for its CQI/interference/RSRQ/etc. For example, $I_t = f I_{t-1} + (1-f) i_{t-1}$ may be used for interference filtering, where $i_{t-1}$ is the instantaneous measurement at time t−1, and $I_{t-1}$ is the filtered measurement at time t−1, and f is the filter constant, normally 0.7-0.99. It may take a while for the filter to converge to the new interference condition, and especially so if the interference measurement is based on CSI-IM (CSI interference measurement) resources, which is sparse in time.

For example, if the filter constant f=0.9, then the filter time constant is 9.5 samples. It takes 2-3 times of the time constant for the filter to settle to 85%-95% of new filtered values. That is, CRS based interference measurements take about 19 ms to 28 ms to settle. Similar computation can show that CSI-IM resource based measurements take about 95 ms to 142 ms to settle if the CSI-IM resource has period 5 ms, i.e. once in 5 ms. The CSI-IM resource based measurements take about 190 ms to 285 ms (or 380 ms to 570 ms, or 760 ms to 1140 ms, respectively) to settle if the CSI-IM resource has period 10 ms (or 20 ms, or 40 ms, respectively). These will cause the network to respond slowly to the interference jump and the long transient period may see some degradation of user experience. In particular, these may affect CQI/PMI/RI feedback, RSRQ measurements, etc., causing mismatches in CQI and RSRQ and hence the transmission to the UE becomes less efficient. One may choose a smaller filter constant f to reduce the latency, but it may be too sensitive to normal fluctuations if the smaller filter constant is always used. Therefore, it is considered that, if the network sends a reconfiguration signal to a UE to notify the change of measurement conditions, it can facilitate UE reconfiguration and network operations. For example, UE may reset its filter state upon receiving the signal (e.g., restarting the CSI-IM resource based measurement process), or adjust its filter constant to a smaller one. If the UE is signaled to adjust its filter constant to a smaller one, the UE may receive another signal later indicating the completion of the transition/reconfiguration and the UE may adjust its filter to the original value. In other words, the network may configure the UE to adapt the filter according to environment changes by reconfiguration signals.

A UE performs layer 3 filtering for RSRP and RSRQ (RSSI). RSRP layer 3 filtering may not need to be reset when interference condition changes, but the performance in terms of accuracy may be affected when the interference condition changes. For example, when the interference level is normal, RSRP accuracy may be at a first level. When the interference jumps to a much higher level, RSRP accuracy may degrade to a second level. It may be useful for the network and UE to know and incorporate the performance changes due to network condition changes, so that the UE may adapt its RSRP estimate/filtering according to interference condition changes. RSRQ layer 3 filtering may need to be reset when interference condition changes. A typical input period to layer 3 filtering is 40 ms, and a default time constant is about 1.5 input sample duration, so 2~3 times of the time constant is about 3~4 input sample duration (about 120 ms to 160 ms). Therefore, if the interference condition takes a sudden jump at a time close to the RSRQ/RSSI reporting time, then the reported RSRQ/RSSI may not reflect the actual interference condition. To facilitate the process, a signal to indicate the reset/reconfiguration may be used. If a reset is needed in layer 3 operations, it can be standardized that upon receiving a reconfiguration signal, the UE resets its layer 3 filter or possibly temporarily adjusts its filter coefficient.

The abovementioned layer 3 related values are computed based on TS 36.331, which is hereby incorporated herein by reference in its entirety. In TS 36.331, the IE FilterCoefficient specifies the measurement filtering coefficient. Value fc0 corresponds to k=0, fc1 corresponds to k=1, and so on.

FilterCoefficient Information Element

The measured result is filtered, before being used for evaluation of reporting criteria or for measurement reporting, by the following formula:

$$F_n = (1-a) \cdot F_{n-1} + a \cdot M_n$$

where $M_n$ is the latest received measurement result from the physical layer;

$F_n$ is the updated filtered measurement result, that is used for evaluation of reporting criteria or for measurement reporting;

$F_{n-1}$ is the old filtered measurement result, where $F_0$ is set to $M_1$ when the first measurement result from the physical layer is received; and $a = 1/2^{(k/4)}$, where k is the filterCoeffient for the corresponding measurement quantity received by the quantityConfig.

The filter is adapted such that the time characteristics of the filter are preserved at different input rates, observing that the filterCoeffient k assumes a sample rate equal to 200 ms.

Thus, it is proposed for a UE to adapt estimation/filtering characteristics based on the received reconfiguration signals. Alternatively, since the network has information about UE's the RSRQ/RSSI estimation/filtering/reporting configurations, it may coordinate the network components so that a sudden interference change can occur only at certain times depending on the timing of RSRQ/RSSI estimation/filtering/reporting; for example, the network may allow a node to be turned on or off only at a fixed offset (or during a specified time interval) from the 200 ms-period RSRQ/RSSI reporting.

An eNB may send a network reconfiguration signal to a UE with a specific timing and associated with a CSI process configuration, CSI-RS resource configuration, and/or CSI-IM resource configuration. The UE may be one that has a certain distance from the node that made the transition. UEs very close to the node are likely to be configured to receive CSI-RS from the node. UEs very far from the node are likely not to be affected by the transition. UEs in between may need some reconfiguration. Upon reception of the reconfiguration signal, UE actions may include: resetting filter states for interference estimation, CSI measurements, RSRQ measurements, and adjusting estimation/filtering parameters to adapt to interference condition change. UEs may also start a new signal/interference measurement process, stop a signal/interference measurement process, perform handover to another point or carrier, etc.

If eNB does not send a network reconfiguration signal to a UE to initiate a reconfiguration, the UE may assume a reconfiguration is needed when a configuration of its CSI-RS resources or CSI-IM resources or CSI process (e.g. for CoMP set) are reconfigured, such as modified, removed, or added. Generally, if the main purpose is only to restart the measurement process on the same resources, reconfiguring CSI process, CSI-RS resource, and CSI-IM resource to achieve the purpose may lead to higher overhead than sending a reconfiguration signal which can achieve the same purpose. However, if there is a timing pattern for the restart of the measure-

```
-- ASN1START
    FilterCoefficient ::=    ENUMERATED {    fc0, fc1, fc2, fc3, fc4, fc5, fc6, fc7,
fc8, fc9, fc11, fc13, fc15, fc17, fc19, spare1, ...}
    -- ASN1STOP
    QuantityConfigEUTRA ::=                SEQUENCE {
        filterCoefficientRSRP    FilterCoefficient        DEFAULT fc4,
        filterCoefficientRSRQ    FilterCoefficient        DEFAULT fc4}.
``` ment process, a timing window may be signaled or defined so that the UE can restart the measurement process at the end of each timing window.

In addition to the overhead concern as mentioned above, we point out that in general, there might be some problems if a UE attempts to interpret some signals as a measurement reset signal or a filter reconfiguration signal. In other words, there may be situations where an explicit a measurement reset signal or a filter reconfiguration signal is needed. For example, for some UEs, using the CSI-RS resource configuration change signal, or CSI-IM resource configuration change signal, or CSI process configuration change signal, as a network reconfiguration signal may cause problems. If a UE moves, its CSI-RS resources may naturally update, and its interference condition does not have any abrupt change, so there may not be always the need to reset its measurement process or reconfigure the filtering parameters and so on, even if it's the CSI-RS resource configuration is updated. A neighboring UE may not experience any CSI-RS resource change, but it may still experience significant interference condition change when a network transition occurs. Therefore, there exist cases in which the configuration of CSI-RS resources, or CSI-IM resources, or CSI processes are updated, but there is no need for the measurement process to be reset or filter to be reconfigured, and cases in which the CSI-RS resources, and CSI-IM resources, and CSI processes are not updated, but there is a need for the measurement process to be reset or filter to be reconfigured.

Figure 3:
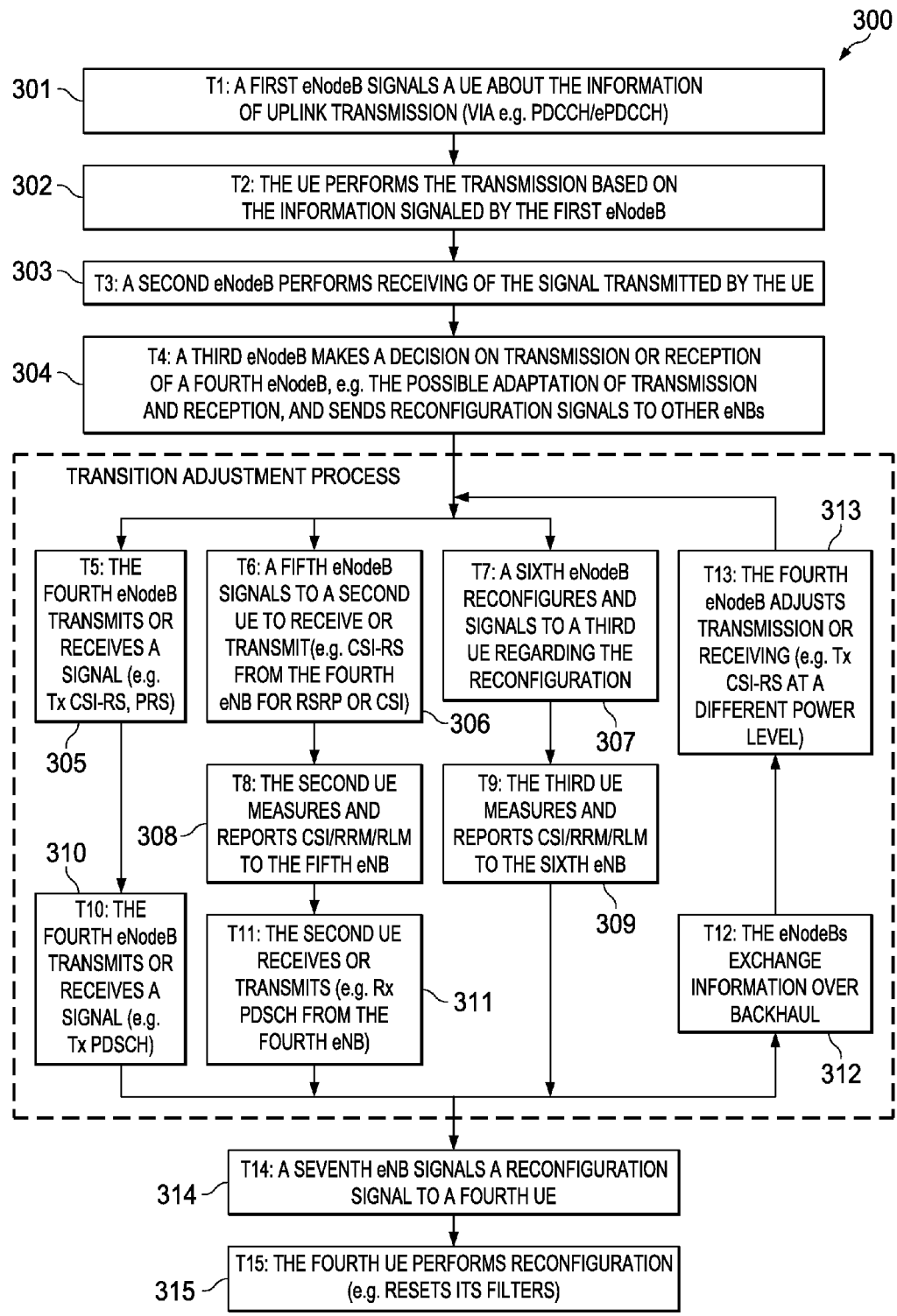
FIG. 3 illustrates a transition adjustment period flow diagram.

The reconfiguration signal may not be the same as the transition decision signal (see the signal in Step 304 of FIG. 3). For example, the transition decision generally only turns on CRS/CSI-RS transmissions, and whether there will be PDSCH transmissions (which means more interference than just RS transmissions) depends on other factors such as CSI feedback and scheduling. The first eNB may send the reconfiguration signal if it changes its PDSCH activity levels significantly, such as turning on PDSCH based on UE CSI feedback. In other words, the transition decision and interference sudden jump may occur at different times, despite that there are some connections between them. Separating the reconfiguration signal from the transition decision signal may also prevent the system oscillation. For example, after the first eNB's transition from the dormant state to active state, it receives UE measurement feedback reports, and decides not to serve the UEs and may even turn off. In such a case, it may not be needed for the neighboring eNBs to signal their UEs for reconfiguration and neighboring UEs to reset their filters. The reconfiguration signal may be signaled by upper layer or PDCCH/EPDCCH or in common channel. A timing may also be sent with the reconfiguration signal to indicate when the reconfiguration will be in effect.

Transition Adjustment Period

A network component may often adapt its activity or go through transitions. When a network node experiences or foresees a transition, it may signal its UEs and other nodes regarding the transition so that the UEs and other nodes may know when and how to adapt. This triggers transient dynamics for a period of time called Transition Adjustment Period with some specific procedures as described in detail below.

An eNB sends a network reconfiguration signal to neighboring eNBs. Upon reception of the reconfiguration signal, the eNBs actions may include: reconfiguring their UEs for CSI-RS resources, CSI-IM resources, and/or CSI processes, and then receiving their UE CSI/RRM/RLM reports, and then changing their transmission/receiving and/or their UE association/configurations. The effect of the eNB having made the transition is evaluated by the network. The eNBs further adjust their transmission/receptions and their UE associations/configurations till convergence or according to some exit rules.

A transition at an eNB may cause multiple eNBs to further adjust their transmission/receptions and their UE association/configurations till convergence. The above-described steps form a procedure for the network to adjust/fine tune after a transition, referred to as a transition adjustment process. A set of eNBs/UEs may need to be informed about this process. The process may be performed on a specific subset of resources (e.g. probing resources, see paragraphs below) or on all relevant resources. Whether it is performed on probing resources only (which may be a subset of time-frequency resources), or on a larger scale of resources, may be indicated in the reconfiguration signal.

FIG. 3 illustrates a block diagram of transition adjustment process operations 300. In step 301, a first eNodeB signals a UE about the information of uplink transmission (via e.g., PDCCH/EPDCCH). In step 302, the UE performs the transmission based on the information signaled by the first eNodeB. In step 303, a second eNodeB performs receiving of the signal transmitted by the UE. In step 304, a third eNodeB makes a decision on transmission or reception of a fourth eNodeB, e.g., the possible adaptation of transmission and reception, and sends reconfiguration signals to other eNBs.

As part of the transition adjustment process, in step 305 the fourth eNodeB transmits or receives a signal (e.g., Tx CSI-RS, PRS, or other reference signals). In other words, the fourth eNodeB can be a turned-off eNB and is starting to turn on, or more generally, it is a network entity going through transition such as on/off, power adaptation, carrier adaptation, carrier type adaptation, etc. Then in step 310 (generally at the end of the Transition Adjustment Process) the fourth eNodeB transmits or receives a signal (e.g., Tx PDSCH or other data carrying signals); i.e., the fourth eNodeB starts to serve UEs and engage in data communications, namely the transition involving the fourth eNB is completed.

In step 306 which may be done in parallel to step 305, a fifth eNodeB signals to a second UE to receive or transmit (e.g., CSI-RS from the fourth eNB, which has been transmitted starting in step 305, for RRM (RSRP/RSRQ) or CSI measurements). Then in step 308 the second UE measures and reports CSI/RRM/RLM to the fifth eNB; note that at this moment the second UE is not connected to the fourth eNB, so the communication (of either control information or data) has to be done with the fifth eNB. In step 311, the second UE receives or transmits (e.g., Rx PDSCH from the fourth eNB, if the measurement reports associated with the fourth eNB lead to such a decision) as a result of the Transition Adjustment Process. In general, the fifth eNB and the second UE may be close to the fourth eNB, the one going through the transition, and they may be affected by the transition. For example, the second UE becomes connected to and served by the turning-on fourth eNB, and the fifth eNB participates in the process of connecting the second UE with the fourth eNB.

In step 307, a sixth eNodeB reconfigures and signals to a third UE regarding the reconfiguration. Then in step 309 the third UE measures and reports CSI/RRM/RLM to the sixth eNB. In general, the sixth eNB and the third UE may not be very close to the fourth eNB which is going through the transition process so they may not be much affected as those described in steps 306/308/311, but they may still be affected as the third UE experiences interference transition when the fourth eNB is turning on. To cope with the interference change or in anticipation of this change, reconfiguration of the sixth eNB and the third UE may be done as shown in steps 307/309.

From steps 310, 311 and 309, the eNodeBs may exchange information over the backhaul. Then in step 313, the fourth eNodeB adjusts transmission or receiving (e.g., Tx CSI-RS at a different power level). For example, if the fourth eNB transmission power is deemed too high by the network based on various feedback and measurement reports, it may reduce its transmission power and the Transition Adjustment Process continues till convergence or certain criteria achieved.

After the entire Transition Adjustment Process is done, in step 314, a seventh eNB signals a reconfiguration signal to a fourth UE as a new interference condition (or more generally, a network configuration) is in place. Then in step 315 the fourth UE performs reconfiguration (e.g., resets its filters).

The terminologies, timing, and timing order here may not be strict, and some steps may be skipped/reordered/changed and some terminologies may be generalized or specialized. For example, step 304 may be included in the transition adjustment process. The transition adjustment process (steps 305-313) may be intertwined with the decision making processes (steps 301-304), and may be done on probing resources only (e.g., in parallel to other normal transmissions) or on all relevant resources. The CSI-RS resource configuration change signal (step 306) and the reconfiguration signal (step 314) should be different in general.

Probing Resources

During the transition adjustment process, the eNB with the point that has been just turned on may need to test several different configurations. For example, by adjusting the power levels (including turning on/off of a transmission point and/or a carrier), adjusting the number of ports, adjusting the bandwidth, changing carriers, etc. This may be done in an iterative way. For example, the eNB Tx at a power level, and based on UE feedback, increases/decreases the power level. For each power level, it leads to a different interference to other BSs/UEs and therefore other BSs/UEs may need to adjust their configurations/transmissions/receptions, which causes a chain reaction that affects this eNB as well, and hence more adjustments are needed. In this process, generally the UE's PDSCH transmission may be affected. For each adjustment, the network monitors UE feedback. This may cause network operation to fluctuate in an unwanted way, such as UE experiencing sometimes lower than normal PDSCH transmission rates lasting for a while, such as hundreds of milliseconds. In other words, it may take a long time for the network to achieve a configuration with suitable and desired performance, and during that process normal data transmissions may be impacted.

An alternative is to perform this in a proactive/prepared way (e.g., predict the system impact/performance before the transition on a smaller scale of resources), and this may be done in parallel with the network's normal operations, thus the normal operations may not be affected; these normal operations include normal data transmissions, normal control/system information transmissions, normal RRM/RLM/CSI measurements and feedback, etc. Resources more suitable for the adjustment processes or probing periods may be defined/allocated. The eNBs configure probing resources, and signals the configured probing resources to selected UEs. A selected UE may be configured to measure on the probing resources (for signals and/or interferences) during the same time period, and report CQI/RRM/RLM measurement reports. The network iterates until it finds a suitable transition and a suitable configuration after the transition, based on varying the transmissions on the probing resources and the feedback reports. Finally the network performs the transitions. The final transitions are expected to be less interruptive and shorter in time since the decided final configurations have been tested to have the desired performance and/or correspond to a steady state. This may significantly reduce the impact on the network and the time spent on adjustment or probing processes.

Thus, during the transition adjustment process, it may be useful to utilize probing resources, such as to perform the transition adjustment on probing resources only. The network predicts the system impact/performance before the transition based on measurements on a smaller scale of resources and this can be in parallel with the network's normal operations without affecting the network's normal operations. A selected UE may be configured to measure the probing resources (for signals and/or interferences) during the same time period, and report channel quality indicators (CQIs), radio resource management (RRM) measurements, radio link monitoring (RLM) measurements, etc. The network iterates until it finds a suitable transition and a suitable configuration after the transition, by keeping adjusting the transmissions on the probing resources and the feedback reports. Multiple configurations may be probed in a parallel fashion or sequentially. Finally the network performs the transitions. This may significantly reduce the impact on the network and the time spent on adjustment or probing processes. The concepts/procedures of using probing resources may be adopted/utilized in very general network reconfigurations, iterated network optimizations, etc.

Probing resources may include probing reference signals (P-RS) and probing interference measurement resource (P-IMR). In LTE and LTE-A, P-RS may be considered as a special CSI-RS (UE may not need to distinguish from other CSI-RS) which may be called P-CSI-RS, and P-IMR may be considered as a special CSI-IM resource (UE may not need to distinguish from other CSI-IM resources) which may be called P-CSI-IMR. Any generalization or specialization or variation of the reference signals or interference measurement resources in LTE/LTE-A may also be used for probing. A radio resource management (RRM)/radio link monitoring (RLM) or CSI report is configured based on the P-RS and P-IMR. Therefore probing resources can be UE transparent sometimes. The filter state may need to be reset once the eNBs start or finish testing a configuration. This may include both the signal measurements and interference measurements. The interference measurement restart may be triggered by a reconfiguration signal to a UE. However, the signal measurement restart may be triggered by another reconfiguration signal. Alternatively this reset may be done automatically according to a specific timing window associated with the P-RS or P-IMR or the corresponding CSI, and the timing configuration may be configured by signaling or specifications. Alternatively, triggering signaling may be sent to a UE to inform the UE about the start, the intervals, and the end of the probing process. Note that in existing standards specifications, multiple CSI processes (CSI reporting configurations, each of which is generally associated with one signal-interference condition) can be supported, but only one RRM measurement process is supported. Introducing P-RS and P-IMR based RRM measurements introduces multiple RRM measurement processes into the system.

In general, however, the probing resources are not necessarily based on P-CSI-RS or P-CSI-IMR. They may be based on general P-RS and P-IMR which can be any time-frequency RS resources and CSI-IM resources assigned for probing purposes. Moreover, they may not even be based on separate P-RS or P-IMR; instead they can be any general time-frequency resources usable for probing purposes. For example, CRS-like reference signals may be used for probing, and the UE may need to first detect the signals, then remove the signals to estimate the interference on the same time/frequency resource, and finally generate CQI reports. For example, the eNBs may assign some time-frequency resources on which some eNBs may transmit data and/or DM-RS, and the UE decodes the data and/or DM-RS and measures and reports CSI (e.g. CQI, PMI, RI, MCS level, RSRP, RSRQ, SINR, channel covariance matrix, interference level, interference covariance matrix, delta CQI, delta RSRP, delta RSRQ, delta interference, etc.) or general condition of the transmission (e.g. ACK/NACK or probability of decoding error). The eNBs may probe for one or more configurations concurrently (i.e. to use the frequency dimension to help reduce probing duration) on multiple probing resources, and the UEs may be required to measure and report one or more CSI. The probing resources may or may not be dedicated for probing purpose only; the eNBs may just reuse a subset of CSI-RS and CSI-IM resources to perform probing, and reuse a subset of CSI report configurations to report the channel status. The eNBs may also schedule some PRBs to transmit some possibly dummy data using some configurations to be probed and check the UE feedback. The eNBs may also allocate specific resources for probing, configure certain parameters for probing (such as measurement timings, reporting timings), and signal them to the UEs; the UEs may follow defined probing procedures with the signaled parameters on the specified resources, in which case the probing is not UE transparent. The probing resources set aside by the eNB may lie on UL time-frequency resources, in which case the probing may be done in the uplink.

Probing resources are mainly for adjustment/probing/prediction purpose. It is not limited to a point turning on/off transition. It may be applied in general network resource adaptation/transitions or transmission scheme change (e.g., coordinated multipoint CoMP scheme change) in an iterative way. It may be used for adjustment/fine-tuning of cell association, power levels, carrier selection, carrier/point on/off decision, load balancing/aggregation/shifting, number of antenna ports, antenna configurations, bandwidth, antenna tilts, codebook structures and parameters, rank adaptation, or precoding. It may be used to provide the eNB the ability of dynamically using a different transmission scheme based on the feedback using the Probing Resources. Probing Resources may be configured differently from different subbands to experiment different configurations at the same time. Feedback based on probing resources may be more lightweighted than other feedback, e.g., lower accuracy, lower overhead, and/or with PMI/RI, etc. Measurements/feedback reports based on probing resources include CQI, PMI, RI, MCS level, RSRP, RSRQ, channel covariance matrix, interference level, interference covariance matrix, delta CQI, delta RSRP, delta RSRQ, delta interference, etc. They may also be used for UL adjustment or probing or performance prediction. Moreover, in order for the network to be able to determine suitable transmission schemes by probing, the network may need to support most or all of the transmission modes on probing resources; for example, the normal data transmission may be in TM8, while in the meantime the probing transmission is set to be consistent with TM10. To determine data SINR for, e.g., TM10, by probing, the network may configure a UE to first report CQI/PMI/RI/MCS based on reference signal resources and interference measurement resources of the probing resources, followed by reporting SINR based on data (or dummy data) received on probing resources.

In E-UTRA, Reference Signal Received Quality (RSRQ) is the ratio NxRSRP/(E-UTRA carrier RSSI), where N is the number of RB's of the E-UTRA carrier RSSI measurement bandwidth. The measurements in the numerator and denominator are made over the same set of resource blocks. E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes. In future releases, RSSI may be measured on certain resource elements (REs) specified by the an eNB. In general, total received power includes all RF received by a UE, such as the signal(s) from serving cell(s), interference, and noise, over the time-frequency resources specified in the specifications or indicated by a network controller.

Figure 4:
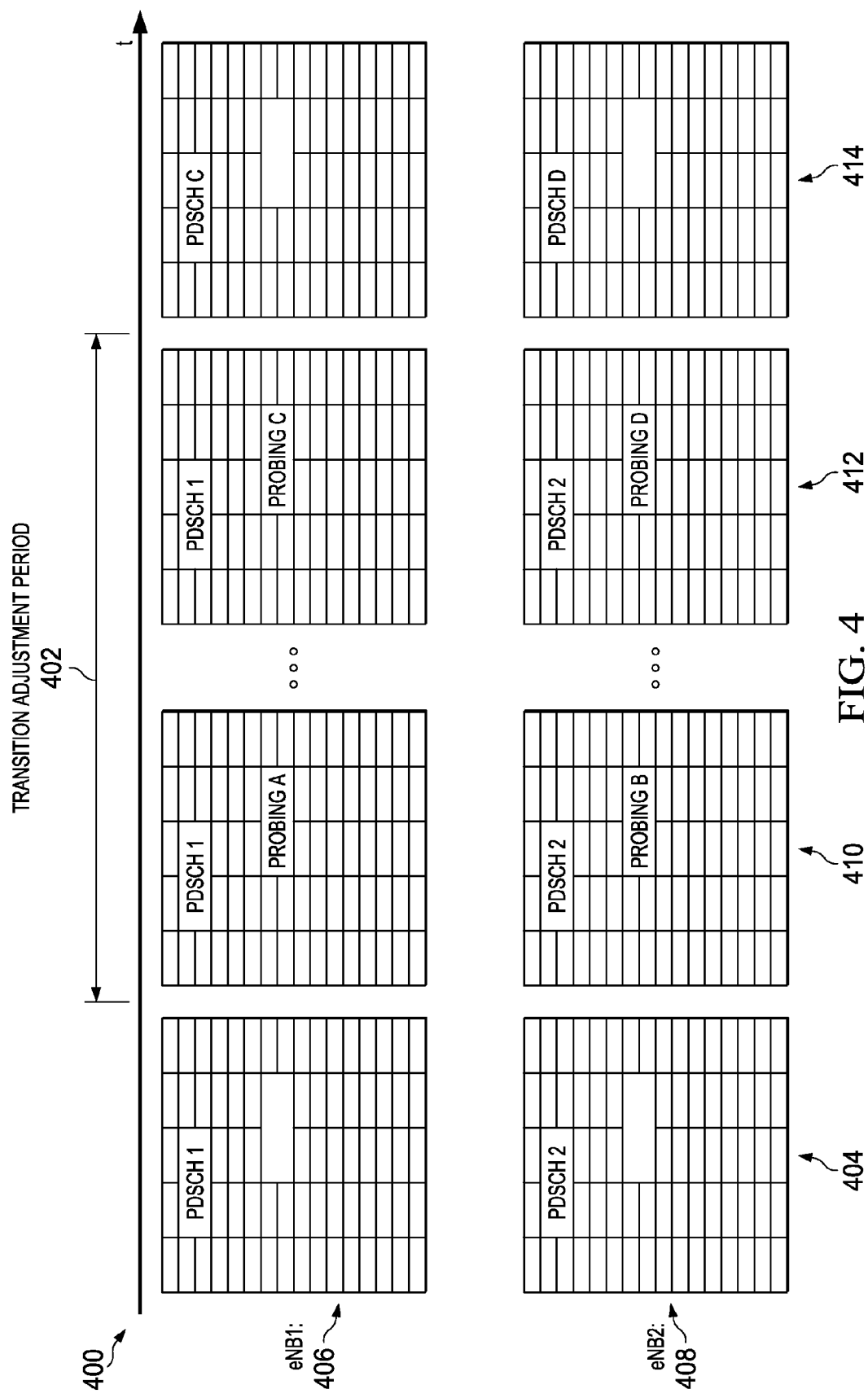
FIG. 4 illustrates a transition adjustment period timeline.

FIG. 4 illustrates a timeline of operations 400 for a transition adjustment period 402 based on probing resources. In the first column 404, eNBs, e.g., eNB1 406 and eNB2 408, set aside probing resources, and coordinate probing transmissions and timings. In the second column 410, eNBs test probing transmissions and adjust. In the third column 412, convergence is achieved on probing resources. In the fourth column 414, the network operates per selected reconfiguration. Further details of various embodiments are described below.

Figure 5:
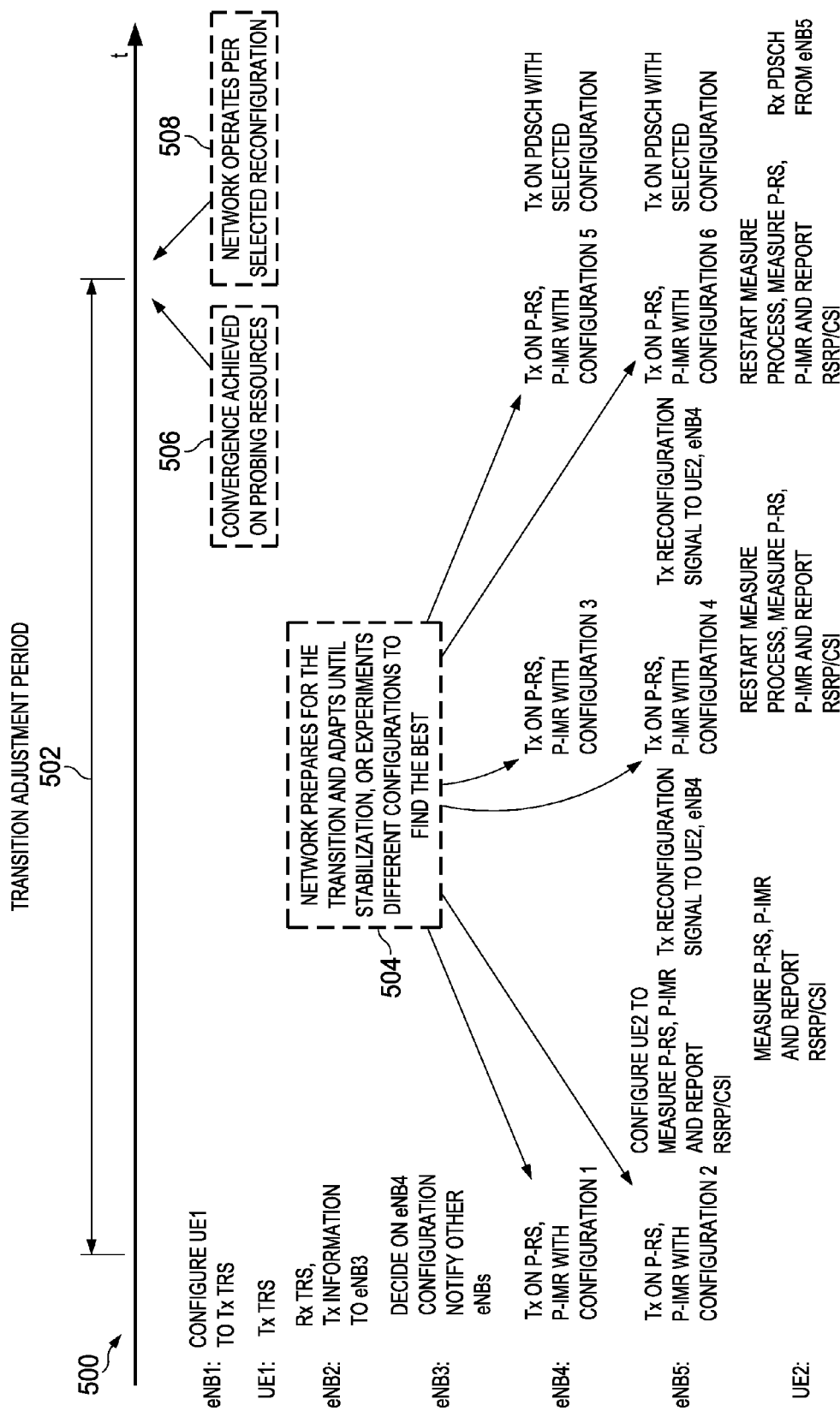
FIG. 5 illustrates transition adjustment period timeline.

FIG. 5 illustrates an example timeline of operations 500 for a transition decision and the transition adjustment process 502 based on probing resources. The network prepares for the transition and adapts until stabilization, or experiments with different configurations to find the desired one or the best one 504. Convergence and/or the desired behavior is achieved on probing resources 506, and the network selects a reconfiguration and operates per the selected reconfiguration 508.

In various embodiments, an eNB experiencing a transition, or foreseeing a transition, may do the following. The eNB may send a reconfiguration signal, together with timing information, over the backhaul to other eNBs. The eNB may send a reconfiguration signal, together with timing information, to its UEs. The eNB may configure probing resources, including a probing reference signal (P-RS) and a probing interference measurement resource (P-IMR) to its UEs, and may configure a transmission scheme with coordination with other eNBs on the probing resources. The effects of the transition and reconfigurations are iteratively evaluated/predicted by the network on the probing resources only. The final configuration obtained at the end of the evaluation period is then applied on all relevant resources. The relevant resources may or may not be in the same type of carrier as that on which the probing is done. For example the final configurations may be applied on a new carrier type (NCT) whereas the probing is done on a Rel-8 compatible carrier.

Various embodiments provide transmission, reception, and signaling methods and systems for reconfiguration in wireless networks. Embodiments provide signals and processes supporting the reconfiguration, either after the transition or joint with the transition. These may include: backhaul signaling to coordinate the reconfiguration among multiple nodes; reference resources such as probing resources including probing reference signals (P-RS) and probing interference measurement resources (P-IMR), to measure the effect of transition and reconfiguration by UEs; and reconfiguration signaling to UEs to indicate the occurrence of transition and reconfiguration to the UEs (e.g., UEs may restart their measurement processes for the updated configurations).

In an embodiment, the impact of the transition/adaptation should be evaluated by multiple nodes/UEs before, during, and/or after it takes place. Probing resources based on CSI-RS and interference measurements are used to evaluate the transition/adaptation/reconfiguration impact before it is applied to PDSCH. In an embodiment, the network and UEs may adjust their configurations. Signaling from an eNB to a UE or another eNB indicate a transition/reconfiguration will occur such that the UE and other eNBs can operate accordingly. Embodiments provide reconfiguration signals and processes when the network adapts its topology/transmissions. Embodiments may be implemented in handsets and networks used in wireless communication systems.

Probing may or may not always involve UEs. For example, as described in FIG. 2, probing can be used to reconfigure the transmissions between macros and relays over the air. Probing may or may not always involve eNB reconfigurations. For example, in a device-to-device (D2D) or direct mobile communication (DMC) network, probing can be used to reconfiguring the transmissions between UEs. In these cases, the general approaches described in various embodiments can still be applied with appropriate modifications.

As an example, suppose the network is experiencing decreased traffic load and is trying to turn off some picos to save energy and reduce emission. The network determines some candidate picos to be turned off. However these candidate picos may be serving some UEs and in case some of the picos are actually turned off, their UEs need to be offloaded to other active picos. This may significantly change various aspects of the network operations, such as interference conditions, pico-UE associations, picos' loadings, etc. For example, if a UE is offloaded from its current pico to another pico, the second pico may see an increase of its loading; if the increased loading may exceed some threshold, the UE QoS may suffer significantly and hence the network may decide not to offload to the second pico or decide not to turn off the first pico. It can be seen from this particular example that the network may need to predict the new operation condition before making a good transition decision (otherwise the decision may cause severe problems), but such a prediction, though very useful and highly desired to be as accurate as possible, is very difficult to be done with decent accuracy without being actually tested in the network. In this situation, probing can be beneficial. For example, on some probing resources, a first pico "emulates" the case that it is turned off (and hence reduced interference to neighboring points' UEs) and its UE is offloaded to the second pico. The UE reports the CQI associated with this probing setting, which may help the network to decide if the turning-off decision is eventually beneficial/problematic. A second pico may even perform the actual transmission/scheduling of the UE on the probing resources so that the network can obtain even more accurate information regarding the impact of turning-off and offloading.

Embodiments may affect standards in various ways. For DL/backhaul signaling, an eNB sends a reconfiguration signal (together with a timing) to UEs and eNBs. The UE assumes a new measurement condition (for signal measurements and/or interference measurements) will be in effect for the indicated CSI-RS resource configuration, CSI-IM resource configuration, and/or CSI process configuration. The eNBs are assumed to reconfigure according to their UEs' feedback based on the indicated resources.

For DL/backhaul signaling, an eNB sends a signal to indicate the start and/or finish of a transition adjustment period. Within the period, the probing resources may be used to experiment with several configurations. A UE may apply a measurement timing window during the period. After each timing window, the UE restarts its measurement process on the probing resources.

For UE reconfiguration signal design, if the reconfiguration signal is in PDCCH/EPDCCH, the latency is small, but DCI formats may need to be modified to include the reconfiguration indications, and the reconfiguration may not be logically related to DL/UL grants since it may happen that when an eNB needs to transmit a reconfiguration signal to a UE, the eNB has no DL/UL grants for the UE. Then a reconfiguration signal may be a field of a DCI format, or may be a special, light-weight DCI only for reconfiguration. If the reconfiguration signal is in upper layer signaling, the latency may be large, but there is no need to modify DCI formats. If the reconfiguration signal is in common channels, a drawback may be that not all UEs may need to reconfigure.

For UE behavior, in general UE layer 1 filtering design/operation is an implementation issue not specified in the specifications. However the UE should be signaled if a network transition occurs, which requires specification support. Whether and/or how the UE will react are generally left for implementation, which does not require specification support. UE layer 3 filtering for RSSI/RSRQ may need to be reset, and if so, it may need to be standardized.

For UE behavior, if the probing resources are mainly used for generating the probed CSI, generally the UE needs to rate match around the probing resources, regardless of whether the resource is used as P-RS or P-IMR, and regardless of whether the probing resources are CSI-RS/CSI-IM resources or not. However if the probing resources carry actual data, i.e., used for data transmission instead of for measurement purposes only, then the UE may not perform rate matching on all probing resources. Instead, the UE does rate matching on the subset of probing resources that are for measurement purposed only. Appropriate rate matching signaling may be used to support these operations, for example, the signaling of zero-power CSI-RS configurations to a UE.

The probing resources may be associated with a trigger, or a timing window to automatically restart the measurement process. RRM/CSI feedback report configurations based on the probing resources may be different from other feedback report. Therefore, multiple timing configurations may be used for multiple measurement processes/configurations.

An embodiment method for adaptation in a wireless network includes eNBs coordinate and set aside a set of time-frequency resources (for probing purposes), eNBs coordinate a set of operations (probing transmissions) and timings (to be used to synchronize eNBs/UEs actions), eNBs signal the resources and timings to UEs, eNBs perform the coordinated operations on the resources according to the timings, eNBs receive feedback reports from UEs based on UE measurements on the signaled resources according to the signaled timings (eNBs collecting probing impact); and eNBs further coordinate the operations (for further probing or applying probing transmissions on broader time-frequency resources).

An embodiment method for adaptation in a wireless network includes the following. eNB1 sends UE1 a configuration of a measurement process, a configuration of measurement resources associated with the measurement process, a time interval associated with the measurement process, a reporting configuration associated with the measurement process; these as a whole may be referred to as probing related configurations. One or more of these configurations may be combined as one configuration, or included in another configuration. For example, the configuration of measurement resources may be included in the configuration of a measurement process. The measurement process may be a CSI process as defined in 3GPP Rel-11, which may contain configurations of channel/interference measurement resources (e.g. CSI-RS resource and CSI-IM resource). The reporting configuration may indicate periodic reporting (in which case the periodicity and subframe offsets of the reporting subframes may be signaled) or aperiodic reporting (in which case the reporting trigger information may be signaled). The time interval specifies that the measurement should be performed within the time interval.

Moreover, eNB1 may send signaling to a UE2 to indicate probing related configurations pertinent to UE2. The time interval sent to UE2 may be generally the same as that sent to UE1. The other configurations sent to UE2 may or may not be the same as those sent to UE2. Not all UEs served by eNB1 may receive such configurations.

Upon reception of the configurations, UE1 may perform a measurement in accordance with the measurement process configuration based on the configured measurement resource within the configured time interval. For example, UE1 may perform SINR measurement based on the CSI-RS resource and CSI-IM resource, starting from the beginning of the time interval and ending by the end of the time interval. Then the UE may generate a report in accordance with the measurement process configuration and the reporting configuration based on the measurement.

eNB1 may send the time interval information and/or measurement resource configuration information to eNB2. In general, the measurement resource configuration information may be associated with UE1 and/or UE2, or with part or all of the UEs receiving probing related configurations from eNB1, but it may or may not be identical to the measurement resource configuration received by any UE from eNB1. In other words, eNB1 may aggregate/select the measurement resource configurations sent to its UEs, and send the aggregated/selected measurement resource configuration(s) to eNB2. eNB1 may also send the time interval information and/or measurement resource configuration information to eNB3. Though in general the time interval information is the same, the measurement resource configuration information sent to eNB3 may or may not be the same as that sent to eNB2. eNB2 may send probing related configurations to its UEs, wherein in general the time interval information is the same across all UEs and all eNBs (though the network has the flexibility to configure the time intervals differently for different eNBs/UEs if there is some propagation isolation, etc.).

The time interval may be configured as a starting time, a time duration, and/or an ending time. The starting time may be indicated as a time offset (such as a certain subframes later than the reception subframe, etc.), or a time in future (such as a subframe within a radio frame with a certain system frame number), or by a starting time trigger. Similarly the ending time may be indicated. Alternatively, the ending time may be indicated indirectly from the starting and a time duration. There may be multiple time intervals which are usually contiguous in time. The time intervals may be indicated by a starting time using the abovementioned methods as well as a periodicity; to be even simpler, the periodicity signaling may be sent at the starting time of the first time interval so that the UE can obtain both the periodicity and starting time from one signaling. Another way of specifying multiple time intervals to a UE is based on starting time triggers. When the UE receives a first starting time trigger, it starts the measurement; when it receives a second starting time trigger, it understands that the first time interval is ending and the second time interval is starting, and it will reset the measurement process accordingly. With either one or multiple time intervals, the UE generates one or more measurement reports according to the measurement process configuration and reporting configuration; however each report is based on measurement over the configured measurement resources within one time interval of the one or multiple time intervals. The timing configuration may also include one or more timing gaps on which the UE is not supposed to perform measurements. The configuration of a timing gap can be combined with above-mentioned embodiments. A UE may receive a set of time intervals for one type of measurement, and another set of time intervals for another type of measurement, such as different time intervals for RRM and CSI measurements, and different time intervals for signal and interference measurements.

An embodiment method for downlink signaling in a wireless network includes signaling to a UE an index of an CSI-IM resource, CSI-RS resource, or CQI report/CSI process, together with a timing and/or a time period, wherein the UE will measure and feedback based on the resources associated with the indexes and timing, the UE assumes a new measurement condition for the indicated CSI-IM resource, CSI-RS resource, or CQI report/CSI process will be in effect since the indicated timing and/or according to the indicated time period, and the eNB adapts its transmissions (e.g., precoding, muting or non-muting) on the indicated CSI-IM resource and/or CSI-RS resource only according to the indicated timing and/or timing period.

An embodiment method for backhaul signaling in a wireless network includes signaling to a second eNB of an CSI-IM resource and/or CSI-RS resource, together with the same timing and/or a time period, wherein the second eNB sends a DL signaling to a UE.

An embodiment method for backhaul signaling in a wireless network includes signaling to a second eNB of an CSI-IM resource and/or CSI-RS resource, together of a timing, wherein the eNBs adapt their PDSCH transmissions (e.g., precoding, muting or non-muting) according to the transmissions on the indicated CSI-IM resource and/or CSI-RS resource at the indicated timing, and the eNBs signal the UEs to stop the measurements and feedback according to the timing. In any case, if the timings are signaled, the timings may be signaled only once at the beginning of the probing process (e.g. a sequence of timings of t0, t1, . . . , tk with a predetermined k), or signaled over time when needed.

In an embodiment method, the timing exchanged by eNBs and/or the timing exchanged between the eNBs and UEs are not present. This has the benefit of less signaling overhead, however the probing may become more lengthy in time and more likely to fluctuate. On the other hand the timing may be either predefined or partially predefined so that either no signaling about timing or a simplified signaling about timing may be used, thus the signaling overhead may be reduced.

A point may take the following states:
Backhaul connection only. At this state, the point has completely turned off its over the air Tx/Rx, but can only Tx/Rx signalings over its limited backhaul.
Limited monitoring state. At this state, the point can perform limited Rx over the air, no Tx over the air, and can Tx/Rx signalings over its limited backhaul.
Probing state. At this state, the point can perform over the air Rx, over the air Tx of reference signals, and Tx/Rx over its limited backhaul. The point may adjust its transmission parameters (e.g., RS power) during this state.
Active state. At this state, the point can perform over the air Tx/Rx of data, and Tx/Rx over the possibly high-speed backhaul.

Figure 6:
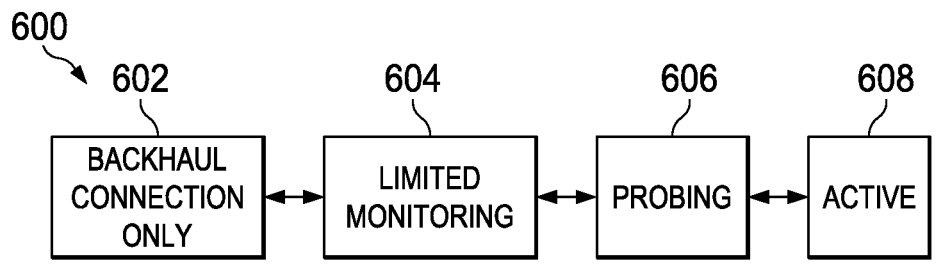
FIG. 6 illustrates state transitions for a point.

FIG. 6 illustrates state transitions 600 for a point. The point may transition between a backhaul connection only state 602, a limited monitoring state 604, a probing state 606, and an active state 608. A point going through a state transition may need to signal to its UEs and neighboring points over the air or over X2 interface, which may trigger a transition adjustment process across multiple eNBs and UEs. A point here may be a cell, antenna set, a frequency band/carrier, macro/pico/femto/relay, etc. In addition, a point may be transitioned to or from a completely powered-off state, and the reconfiguration and transition adjustment process may be applied as well.

Figure 7:
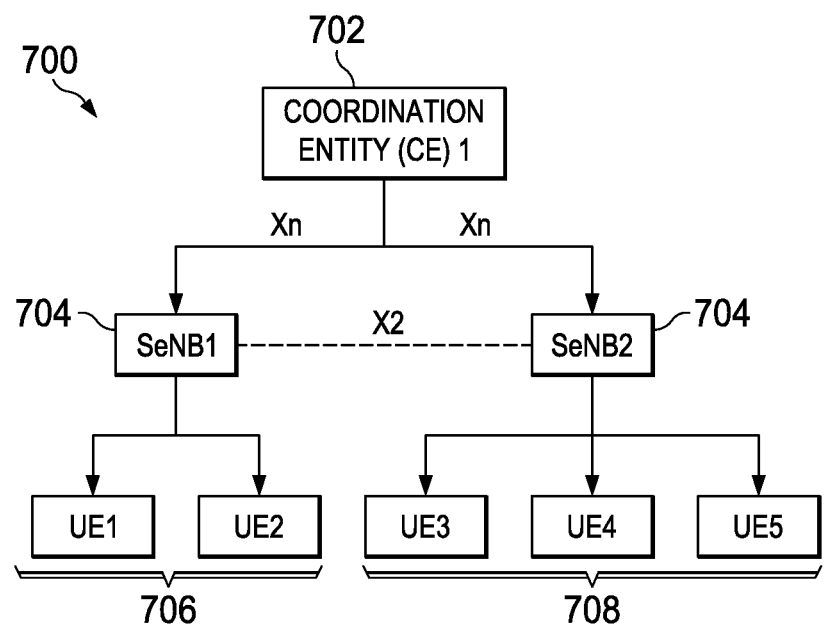
FIG. 7 illustrates an example system diagram.

FIG. 7 illustrates one example diagram of the system 700 with a coordination entity (CE) 702 coordinating multiple eNBs 704. The CE 702 may be a macro eNB, or other network entity. The SeNB 704 stands for secondary (or small cell) eNB, which may be coordinated by the CE 702 via the Xn interface, usually over a non-ideal backhaul. The SeNBs 704 may be connected via X2 interface, usually over a non-ideal backhaul. The CE 702 can coordinate the SeNB 704 on/off, carrier selection, load balancing/shifting/aggregation, and other general interference management and coordination operations. UEs 706 are coupled to the SeNBs 704.

Figure 8:
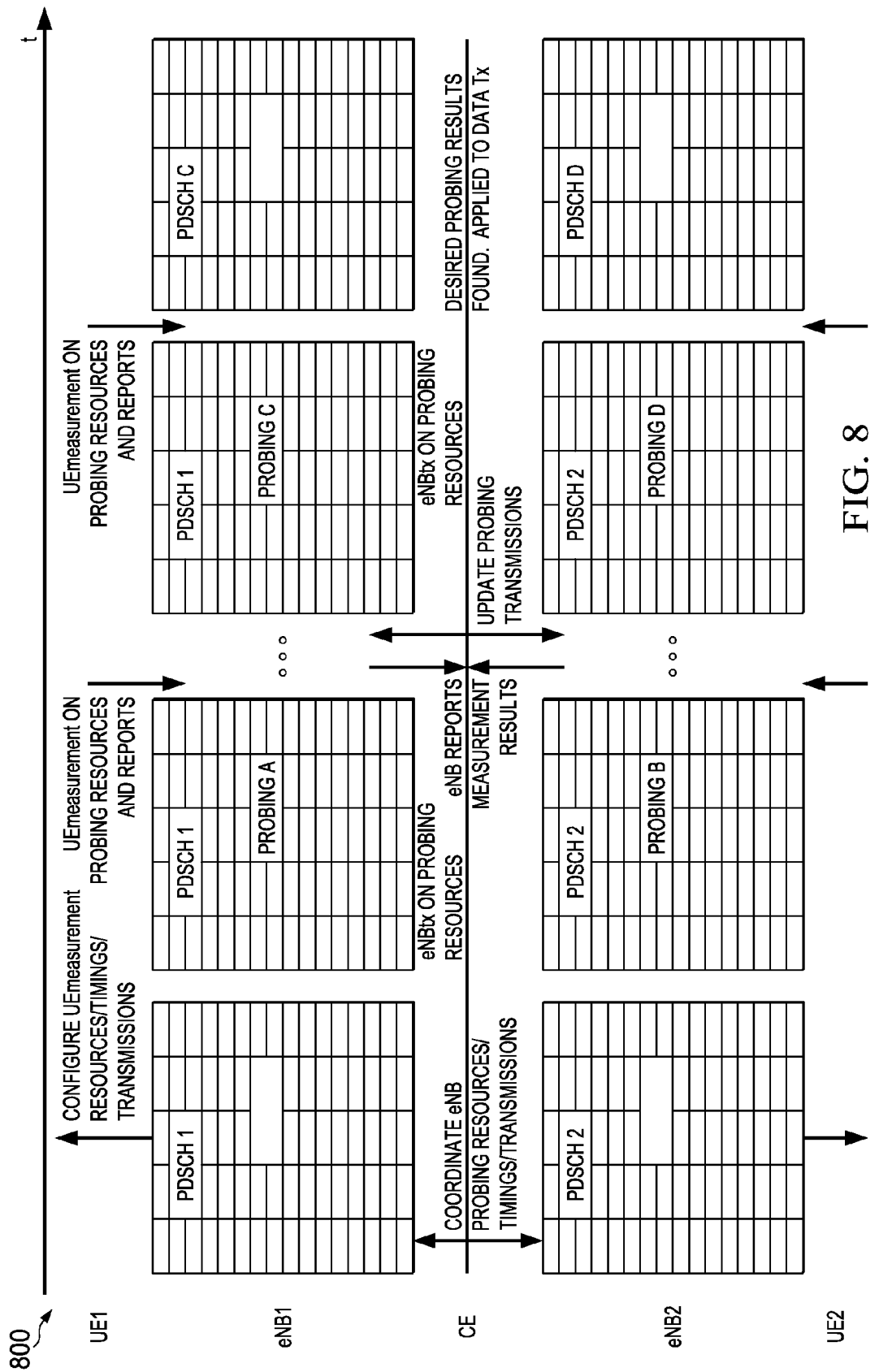
FIG. 8 illustrates an example of probing operation.
Figures 9, 10:
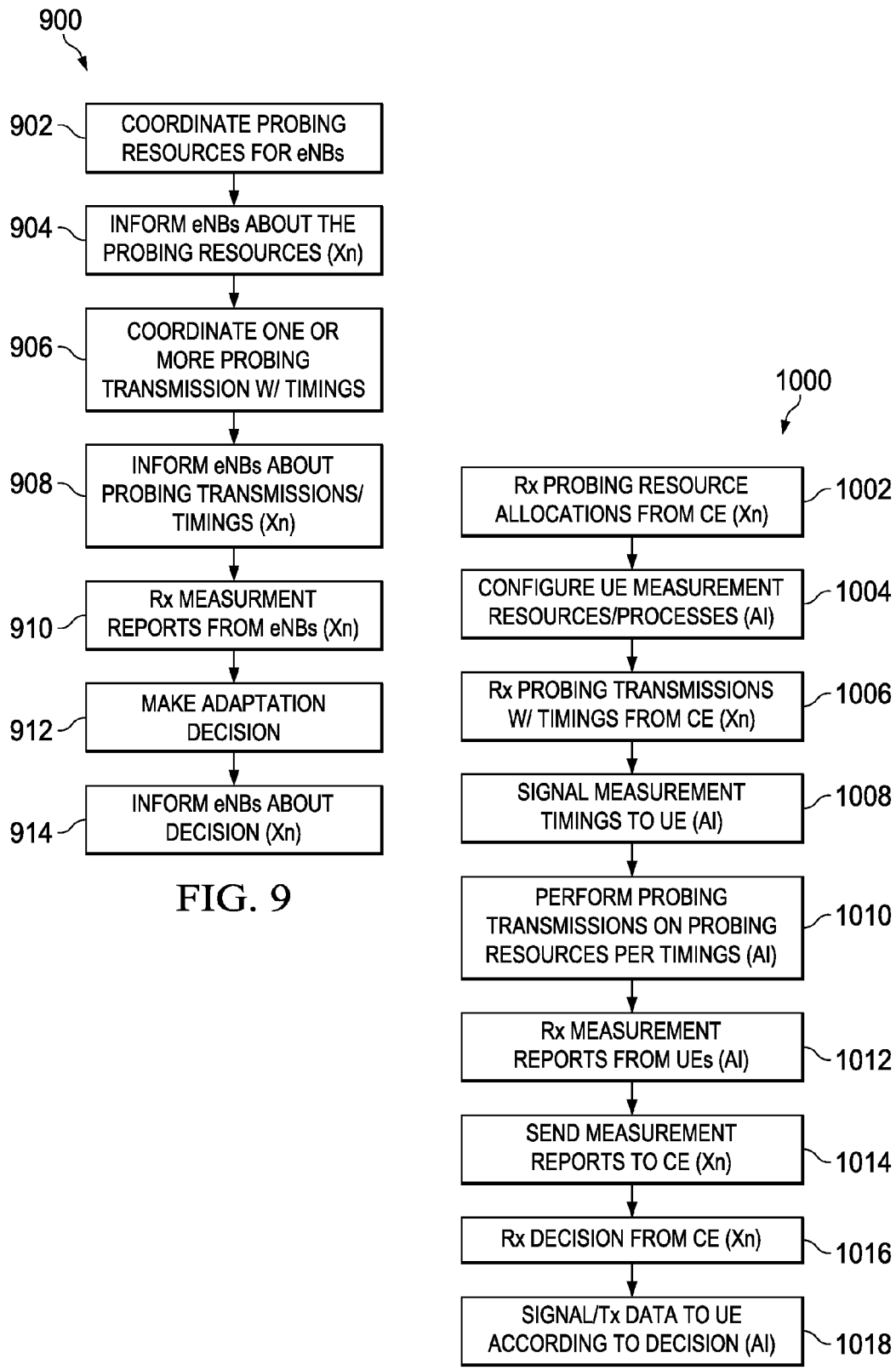
FIG. 9 illustrates a flow diagram of CE operation.
FIG. 10 illustrates a flow diagram of eNB operation.
Figure 11:
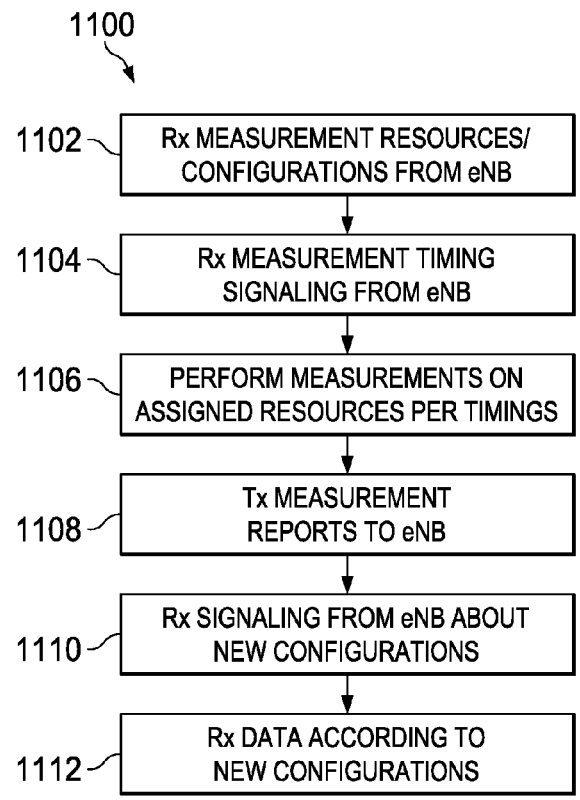
FIG. 11 illustrates a flow diagram of UE operation.

An example of the probing operation 800 over this system architecture is shown in FIG. 8, and flowcharts are shown in FIG. 9-11. In FIGS. 9-11, the annotations inside the parentheses indicate over which interface the signaling/signal is sent. Xn indicates signaling sent over the Xn interface, while AI indicates signaling or data sent over the air interface. A flowchart for CE operation 900 is shown in FIG. 9. In step 902, the CE coordinates probing resources for the eNBs. In step 904, the CE informs the eNBs about the probing resources. In step 906, the CE coordinates one or more probing transmissions with timings. In step 908, the CE informs the eNBs about probing transmissions/timings. In step 910, the CE receives measurement reports from eNBs. In step 912, the CE makes the adaptation decision, and in step 914, the CE informs the eNBs about the decision.

A flowchart for eNB operation 1000 is shown in FIG. 10. In step 1002, the eNB receives probing resource allocations from the CE. In step 1004, the eNB configures UE measurement resources/processes. In step 1006, the eNB receives probing transmissions with timings from the CE. In step 1008, the eNB signals measurement timings to the UE. In step 1010, the eNB performs probing transmissions on probing resources per the timings. In step 1012, the eNB receives measurement reports from the UEs. In step 1014, the eNB sends measurement reports to the CE. In step 1016, the eNB receives the decision from the CE. In step 1018, the eNB signals/transmits data to the UE according to the decision.

A flowchart for UE operation 1100 is shown in FIG. 11. In step 1102, the UE receives measurement resources/configurations from the eNB. In step 1104, the UE receives measurement timing signaling from the eNB. In step 1106, the UE performs measurements on assigned resources per timings. In step 1108, the UE transmits measurement reports to the eNB. In step 1110, the UE receives signaling from the eNB about new configurations. In step 1112, the UE receives data according to the new configurations.

A method for adaptation in a wireless network includes a first base station signaling information of a first resource set to a first UE and/or a second base station, the second base station signaling information of a second resource set to a second UE, and receiving feedback from the first and second UEs for the resource sets. The method includes the first base station signaling a first timing to the first UE and/or the second base station, the second base station signaling the first timing to the second UE, and receiving feedback from the first and second UEs about the resource sets according to the first timing. The method further includes the first base station transmitting a first signal on a first subset of the first resource set according to the first timing, the second base station transmitting a second signal on a second subset of the second resource set according to the first timing, and receiving feedback from the first UE about the transmitted first signal, the first resource set, and the first timing. The method further includes the first base station transmitting a third signal on a third subset of the first resource set according to the first timing, the second base station transmitting a fourth signal on a fourth subset of the second resource set according to the first timing, the first base station signaling a second timing to the first UE or the second base station, the second base station signaling the second timing to the second UE, and receiving feedback from the UEs according to the second timing after the UEs stop measurements.

A method for downlink signaling in a wireless network includes a UE receiving from a base station signaling of an index of a CSI interference measurement (CSI-IM) resource, a channel state information reference signal (CSI-RS) resource, a channel quantity indicator (CQI) report, or a CSI process, together with a timing. The method further includes measuring and sending feedback to the base station in accordance with the indexed resource and the timing, assuming a new measurement condition for the indexed resource will be in effect according to the timing, and receiving adapted transmissions from the base station on the indexed CSI-IM resource and/or CSI-RS resource only according to the timing.

Figure 12:
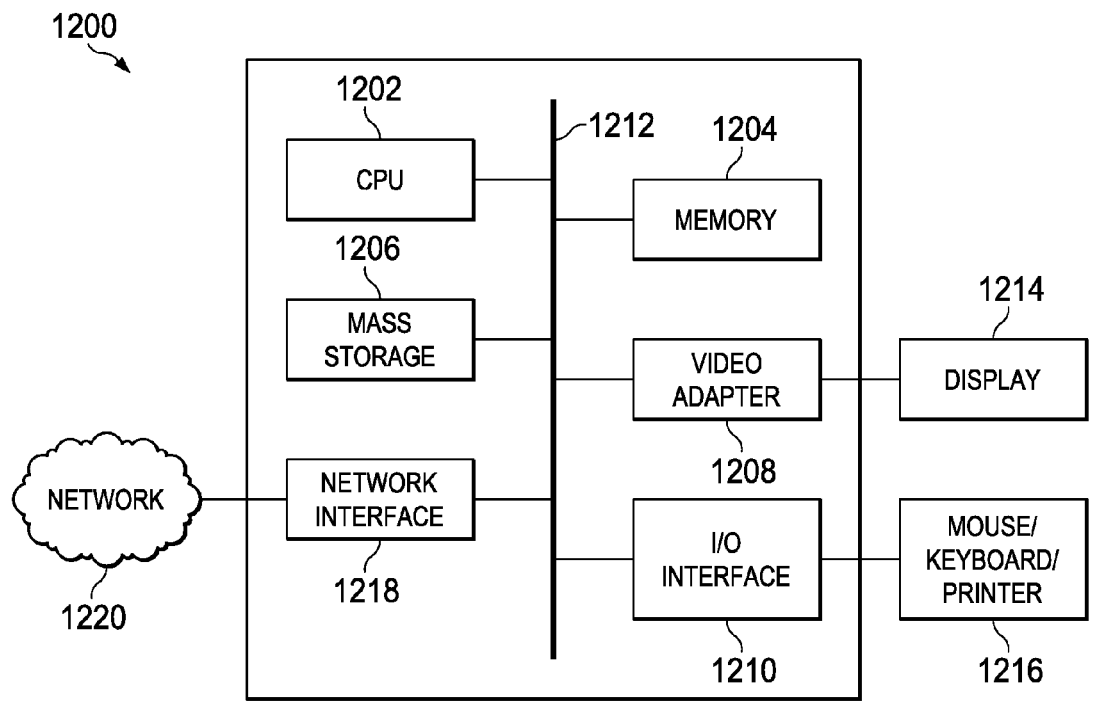
FIG. 12 is a block diagram illustrating a computing platform that may be used for implementing, for example, the devices and methods described herein, in accordance with an embodiment.

FIG. 12 is a block diagram of a processing system 1200 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU) 1202, memory 1204, a mass storage device 1206, a video adapter 1208, and an I/O interface 1210 connected to a bus 1212.

The bus 1212 may be one or more of any type of several bus architectures including a memory bus or memory controller, a peripheral bus, video bus, or the like. The CPU 1202 may comprise any type of electronic data processor. The memory 1204 may comprise any type of system memory such as static random access memory (SRAM), dynamic random access memory (DRAM), synchronous DRAM (SDRAM), read-only memory (ROM), a combination thereof, or the like. In an embodiment, the memory 1204 may include ROM for use at boot-up, and DRAM for program and data storage for use while executing programs.

The mass storage device 1206 may comprise any type of storage device configured to store data, programs, and other information and to make the data, programs, and other information accessible via the bus 1212. The mass storage device 1206 may comprise, for example, one or more of a solid state drive, hard disk drive, a magnetic disk drive, an optical disk drive, or the like.

The video adapter 1208 and the I/O interface 1210 provide interfaces to couple external input and output devices to the processing unit. As illustrated, examples of input and output devices include the display 1214 coupled to the video adapter and the mouse/keyboard/printer 1216 coupled to the I/O interface. Other devices may be coupled to the processing unit, and additional or fewer interface cards may be utilized.

For example, a serial interface such as Universal Serial Bus (USB) (not shown) may be used to provide an interface for a printer.

The processing unit 1200 also includes one or more network interfaces 1218, which may comprise wired links, such as an Ethernet cable or the like, and/or wireless links to access nodes or different networks 1220. The network interface 1218 allows the processing unit 1200 to communicate with remote units via the networks 1220. For example, the network interface 1218 may provide wireless communication via one or more transmitters/transmit antennas and one or more receivers/receive antennas. In an embodiment, the processing unit 1200 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

For example, the various elements or components may be combined or integrated in another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of user equipment (UE) operation, the method comprising:
   performing, by a UE, a plurality of measurement processes for a plurality of respective network configurations determined in accordance with a change in resources or activities of a network element, the performing comprising, for each measurement process:
      receiving, by the UE from a first network controller, a measurement process configuration for the measurement process;
      receiving, by the UE from the first network controller, a first measurement resources configuration of configured measurement resources associated with the measurement process;
      receiving, by the UE from the first network controller, a first time interval configuration of a configured time interval associated with the measurement process comprising a starting time and a period for use in synchronizing base station and UE actions, wherein using the first time interval configuration to configure multiple time intervals;
      receiving, by the UE from the first network controller, a reporting configuration for a report associated with the measurement process;
      performing, by the UE, a measurement in accordance with the measurement process configuration using the configured measurement resources within the configured time interval;
      generating, by the UE, multiple reports of the measurement in accordance with the measurement process configuration and the reporting configuration, wherein each measurement report is in accordance with a respective measurement over the configured measurement resources within a respective single time interval of the multiple time intervals; and
      sending, by the UE, the report to the first network controller in accordance with the reporting configuration; and
   receiving, by the UE, data in accordance with a selected network configuration selected in accordance with results of the measurement processes.

2. The method of claim 1 further comprising a second UE:
   receiving from a second network controller a second measurement process configuration of a second measurement process;
   receiving from the second network controller a second measurement resources configuration of second configured measurement resources associated with the second measurement process;
   receiving from the second network a second time interval configuration for the configured time interval associated with the second measurement process; and
   receiving from the second network a second reporting configuration for a second report associated with the second measurement process.

3. The method of claim 2, wherein the first time interval configuration is the same as the second time interval configuration.

4. The method of claim 1 further comprising:
   configuring one or more of measurement of a received power of a reference signal (RSRP), measurement of a received quality of a reference signal (RSRQ), measurement of a received power over a set of resource elements, measurement of a channel state information (CSI), and measurement of a signal to interference and noise ratio (SINR), in accordance with the measurement process configuration.

5. The method of claim 1 further comprising:
   configuring a first subset of resources in the configured measurement resources associated with measurements of a signal in accordance with the first measurement resources configuration, and configuring a second subset of resources in the configured measurement resources associated with measurements of an interference, or a received total power, in accordance with the first measurement resources configuration.

6. The method of claim 5 further comprising:
   performing a reference signal-based measurement in accordance with the measurement process configuration using the first subset of resources within the configured time interval; and
   performing an interference measurement in accordance with the measurement process configuration using the second subset of resources within the configured time interval.

7. The method of claim 1, wherein the first time interval configuration comprises one or more of a starting time, a duration, and an ending time.

8. The method of claim 7, wherein the starting time is indicated by a starting trigger signal, and the ending time is indicated by an ending trigger signal.

9. The method of claim 7, wherein the ending time is indicated by a second starting trigger signal, and wherein the second starting trigger signal indicates a restart of the measurement process or a start of a second measurement process.

10. The method of claim 7, wherein the starting time is indicated by an immediate previous starting time and a signaling indicating a periodicity.

11. The method of claim 1, wherein the time interval is configured according to a starting time, a periodicity, and an ending time.

12. The method of claim 1 further comprising:
configuring one or more of RSRP reporting, RSRQ reporting, received signal strength indication (RSSI) reporting, CSI reporting, and SINR reporting, in accordance with the reporting configuration.

13. The method of claim 1 further comprising:
using the reporting configuration to configure periodic reporting with reporting timing information or to configure aperiodic reporting with reporting trigger information.

14. The method of claim 1, wherein the measurement process configuration includes information about the first measurement resources configuration.

15. The method of claim 1, wherein the reporting configuration includes information about the measurement process configuration, information about the first measurement resources configuration, or both.

16. The method of claim 1, wherein the first time interval configuration comprises configuration information for multiple concurrent time intervals for multiple concurrent measurement processes.

17. The method of claim 1, wherein the first measurement resources configuration of configured measurement resources comprises a first frequency interval configuration of a configured frequency interval.

18. The method of claim 17, wherein the configured frequency interval comprises selected subbands or a number of resource blocks.

19. A method for operating a wireless network, the method comprising:
coordinating and setting aside a set of time-frequency resources for base stations;
performing a plurality of probing processes for a plurality of respective network configurations determined in accordance with a change in resources or activities of a network element, the performing comprising, for each probing process:
coordinating a set of transmissions and timing interval configurations comprising a starting time and a period for use in synchronizing base station and user equipment (UE) actions, wherein using a first timing interval configuration to configure multiple timing intervals;
the base stations signaling the resources and the timings interval configurations to UEs;
the base stations performing coordinated communications with the UEs on the resources according to the timing interval configurations; and
the base stations receiving multiple feedback reports from the UEs about UE measurements on the signaled resources according to the signaled timing interval configurations, wherein each measurement report is in accordance with a respective measurement over the configured measurement resources within a respective single time interval of the multiple time intervals;
selecting a selected network configuration in accordance with results of the probing processes;
the base stations further coordinating operations for applying the selected network configuration; and
sending, by the bases stations, data to the UEs in accordance with the selected network configuration.

20. The method of claim 19, further comprising:
a first base station signaling to a second base station a configuration of the set of time-frequency resources and a configuration of the timings regarding synchronized base station and UE actions associated with the set of time-frequency resources and timings.

21. The method of claim 19, wherein the coordinating steps are performed by a coordination entity above the base stations.

22. The method of claim 19, wherein the configured measurement resources comprise a configured frequency interval.

23. The method of claim 22, wherein the configured frequency interval comprises selected subbands or a number of resource blocks.

24. A method for backhaul signaling in a wireless network, the method comprising:
signaling, by a first base station to a second base station, a channel state information-interference measurement (CSI-IM) resource or a CSI-reference signal (CSI-RS) resource, together with timing interval configurations comprising a starting time and a period for use in synchronizing base station and user equipment (UE) actions, wherein using a first timing interval configuration to configure multiple timing intervals, for a network configuration determined in accordance with a change in resources or activities of a network element;
the first and second base stations receiving multiple feedback reports from user equipments (UEs) for measurements taken of the CSI-RS resource or the CSI-IM resource at the signaled timing interval configurations, wherein each measurement report is in accordance with a respective measurement over the configured measurement resources within a respective single time interval of the multiple time intervals;
the first and second base stations repeating the signaling and the receiving for a plurality of network configurations determined in accordance with the change in resources or activities of the network element;
the first and second base stations signaling to the UEs to stop the measurements and the associated feedback for the signaled CSI-IM resource or CSI-RS resource at the signaled timing; and
the first and second base stations adapting their physical downlink shared channel (PDSCH) transmissions according to a selected network configuration selected in accordance with results of the feedback.

25. The method of claim 24, wherein the configured measurement resources comprise a configured frequency interval.

26. The method of claim 25, wherein the configured frequency interval comprises selected subbands or a number of resource blocks.

27. A user equipment (UE) comprising:
a processor; and
a non-transitory computer readable storage medium storing programming for execution by the processor, the programming including instructions to:
perform a plurality of measurement processes for a plurality of respective network configurations determined in accordance with a change in resources or activities of a network element, the instructions to perform comprising, for each measurement process, instructions to:

receive, from a first network controller, a measurement process configuration for the measurement process;

receive, from the first network controller, a first measurement resources configuration for configured measurement resources associated with the measurement process;

receive, from the first network controller, a first time interval configuration for a configured time interval associated with the measurement process comprising a starting time and a period for use in synchronizing base station and UE actions, wherein using the first time interval configuration to configure multiple time intervals;

receive, from the first network controller, a reporting configuration for a report associated with the measurement process;

perform a measurement in accordance with the measurement process configuration using the configured measurement resources within the configured time interval;

generate multiple reports of the measurement in accordance with the measurement process configuration and the reporting configuration, wherein each measurement report is in accordance with a respective measurement over the configured measurement resources within a respective single time interval of the multiple time intervals; and send, to the first network controller, the report in accordance with the reporting configuration; and receive data in accordance with a selected network configuration selected in accordance with results of the measurement processes.

28. The method of claim 27, wherein the first measurement resources configuration for configured measurement resources comprises a first frequency interval configuration of a configured frequency interval.

29. The method of claim 28, wherein the configured frequency interval comprises selected subbands or a number of resource blocks.

30. A network controller comprising:
a processor; and
a non-transitory computer readable storage medium storing programming for execution by the processor, the programming including instructions to:
perform a plurality of measurement processes for a plurality of respective network configurations determined in accordance with a change in resources or activities of a network element, the instructions to perform comprising, for each measurement process, instructions to:
transmit, to a user equipment (UE), a measurement process configuration for the measurement process;
transmit, to the UE, a first measurement resources configuration for configured measurement resources associated with the measurement process;
transmit, to the UE, a first time interval configuration for a configured time interval associated with the measurement process comprising a starting time and a period for use in synchronizing base station and UE actions, wherein using the first time interval configuration to configure multiple time intervals;
transmit, to the UE, a reporting configuration for a report associated with the measurement process;
receive, from the UE, multiple reports associated with the measurement process in accordance with the reporting configuration, wherein each measurement report is in accordance with a respective measurement over the configured measurement resources within a respective single time interval of the multiple time intervals; and
transmit, to the UE, data in accordance with a selected network configuration selected in accordance with results of the measurement processes.

31. The method of claim 30, wherein the first measurement resources configuration for configured measurement resources comprises a first frequency interval configuration of a configured frequency interval.

32. The method of claim 31, wherein the configured frequency interval comprises selected subbands or a number of resource blocks.

* * * * *